UNITED STATES PATENT OFFICE.

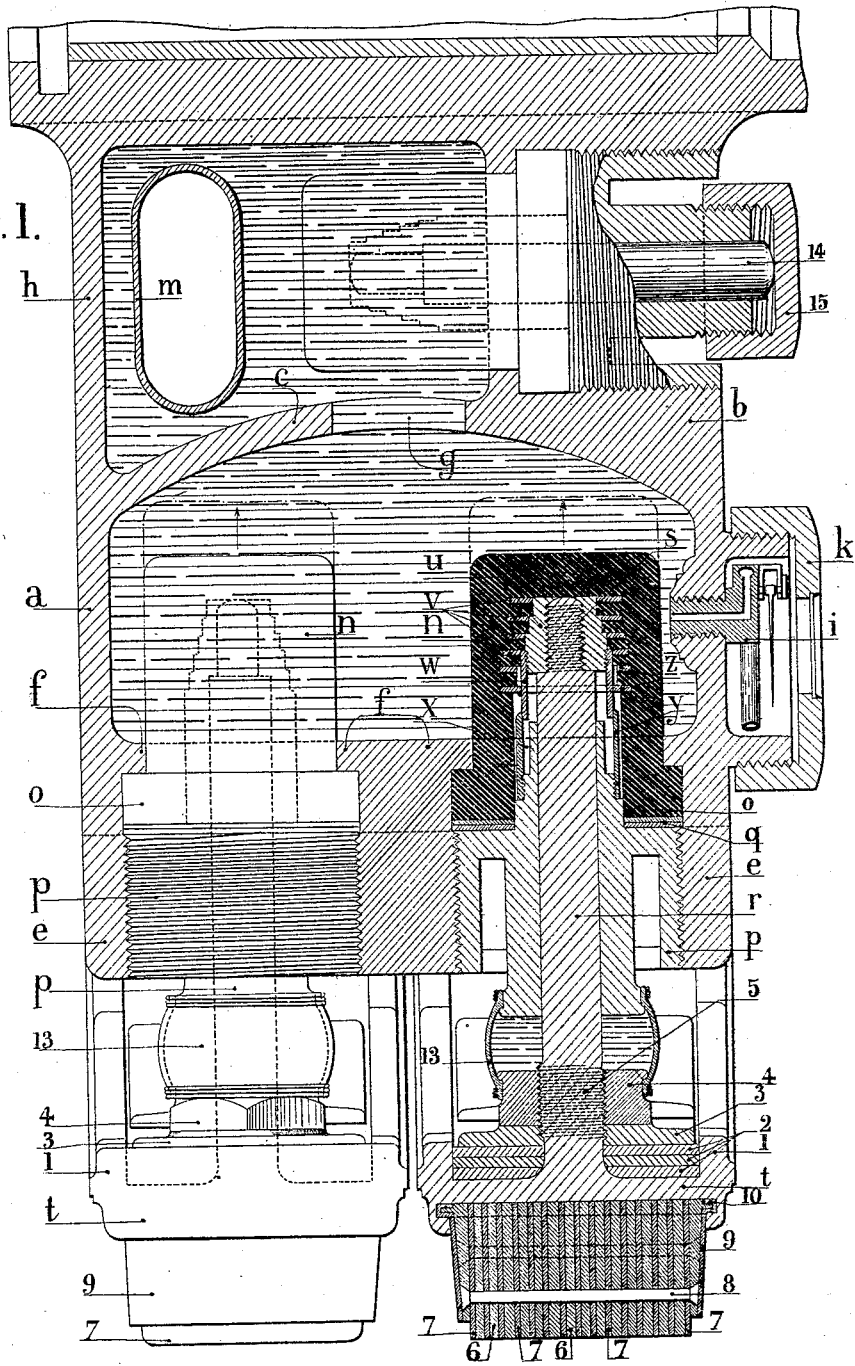

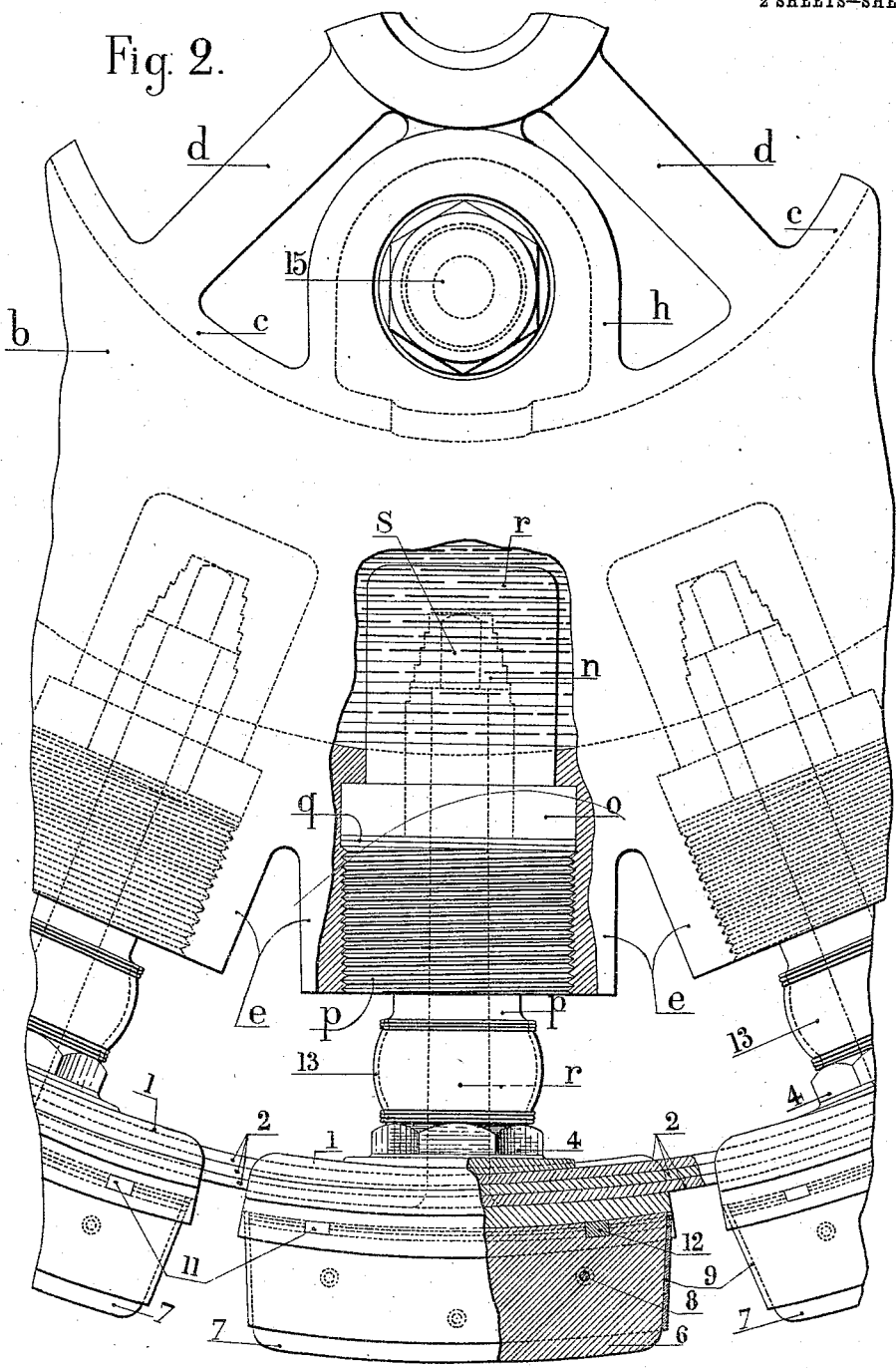

HENRI OUDINOT AND CHARLES PUTOIS, OF COUDRAY MONTCEAUX, FRANCE.

CUSHION-WHEEL.

944,576.　　　　Specification of Letters Patent.　　Patented Dec. 28, 1909.

Application filed December 22, 1908. Serial No. 468,878.

*To all whom it may concern:*

Be it known that we, HENRI OUDINOT, DUC DE REGGIO, and CHARLES PUTOIS, citizens of the French Republic, and residents of Coudray Montceaux, France, have invented certain new and useful Improvements in Cushion-Wheels, of which the following is a specification.

The present invention relates to cushion wheels of the type in which the spokes consist of pistons which plunge into the liquid contained in the hollow hub of the wheel, the elasticity being obtained by means of an air chamber situated in said liquid.

The invention has for its object a certain number of improvements in the construction of wheels of this type for the purpose of realizing an absolute and perfect joint, of facilitating the taking to pieces of the wheel and the regulation of the degree of elasticity. Further, the wheel according to the present invention is very robust and at the same time very supple so that it is particularly adapted for heavy vehicles.

The improved wheel is shown in the accompanying drawings.

Figure 1 represents the wheel in a section taken through the axis of the wheel. Fig. 2 represents part of the wheel in elevation.

To insure a good elasticity to this type of wheels it is indispensable that in the hollow hub be as few openings and joints as possible. With this object in view the hub of the improved wheel is cast in one piece and comprises two lateral flanges $a$, $b$, an inner crown $c$ destined to receive the spokes $d$ (Fig. 2) and an outer crown $e$ of sufficient thickness. Said outer crown presents at the place of each spoke a cylindrical boring which is internally threaded and terminates at its inner end by a flange $f$. Besides said radial openings only an opening $g$ which connects the hollow hub with a hollow prolongation $h$ and a hole in the lateral flange $b$ are provided in the hub which hole is destined to receive a pressure gage protected by a nut $k$. One of the end plates of the prolongation $h$ has a similar boring as those of crown $e$, parallel with the axle serving as inlet for the liquid or for the introduction in the hollow hub of an air chamber $m$ whose volume regulates the degree of elasticity of the wheel.

Through each of the radial borings of outer crown $e$ an india-rubber bag $n$ is introduced into the hollow hub. Said india-rubber bags $n$ have each a lateral flange $o$ at the open end which is destined to be clamped in between flange $f$ of the hub and a tubular nut $p$ screwed into the boring so that the flange $o$ is compressed between it and the respective flange $f$. The nut $p$ has to be screwed up very energetically to obtain a perfect joint; metal washers $q$ are inserted between nut $p$ and flange $o$ of bag $n$.

In the central boring of nut $p$ a piston $r$ is guided, the inner threaded end $s$ of which penetrates into the hollow hub, its outer end terminating in a shoe $t$ destined to be fixed in the felly of the wheel. A head $u$ is screwed upon the front end $s$ of the piston, destined to work in bag $n$ for forcing back the liquid mass when the corresponding piston $r$ has to support the load of the vehicle. With this object in view said head $u$ has several steps, the diameter of which decreases toward the front end, the inner profile of bag $n$ corresponding exactly in shape to said steps so that it tightly fits upon head $u$. Metal rings $v$, one for each step of the head and corresponding in diameter with the respective step are laid in the inner surface of the india-rubber bag so as to tightly embrace the corresponding step of the head. The rear end of head $u$ is threaded and a metal sleeve $w$ is screwed upon it adapted to penetrate into an annular space $x$ which is formed between the narrow front end of nut $p$ and a metal sleeve $y$ screwed upon the front part of said nut and presenting a beveled front edge. Thanks to said sleeves $w$ and $y$ the india-rubber wall of bag $n$ could only come in contact with the outer surface of said sleeves and to prevent even this friction a certain number of metal rings $z$ are further inserted into the inner surface of said bag below head $u$. As shown in Fig. 1 the pistons $r$ are preferably arranged in pairs, each piston having its separate shoe $t$.

The felly of the wheel is constituted by the totality of said shoes $t$ which are connected the one with the others in the following manner:—Each shoe $t$ has a flange $l$ at its long sides, said flanges standing perpendicular to the axle. In said flanges $l$, which are turned upward one or more rings of flexible material, preferably woven of mohair, are placed at the one and at the other side of each spoke, which, if there are employed several of said rings, are superposed and they are strongly pressed upon the upper surface of the shoes $t$ by means of plates 3 and nuts 4 which are screwed upon the threaded part 5 of the corresponding piston $r$.

The tire of the wheel is composed of a number of blocks which have each the shape of a truncated pyramid, the large basis of which is curved according to the curvature of the shoes $t$. Said blocks consist of juxtaposed blades alternatingly of leather 6 and of metal 7 which are clamped together by means of cross bolts 8 riveted at both ends. Said blocks are inserted in a casing 9 of sheet iron, of sensibly rectangular transverse section and corresponding in shape with the shoes $t$. Horizontal flanges 10 at the upper end of the long sides of said casings, having each an incision 11, or several such incisions, are inserted into grooves formed by downwardly projecting flanges of the shoes $t$, the connection between the two parts being effected by means of cotters 12 inserted in said incisions, the flanges of the shoes having, of course incisions which correspond with the incisions of the flanges of the casings.

To prevent the admission of dust between the spokes $r$ and their guide nuts $p$ and to insure at the same time the lubrication of the pistons, india-rubber sheaths 13 are fixed between nuts $p$ and 4 which are filled with a lubricant mainly consisting of castor oil, which does not corrode the india-rubber. The same liquid is preferably used for filling the hollow hub.

The operation of said wheel is easily understood. The india-rubber bags $n$ of those spokes whose blocks 6, 7 are not in contact with the road, and which consequently have not to support any load, are compressed, that is to say that under the pressure which is maintained in the hollow hub, the corresponding spokes are pushed until their heads $u$ abut against the front end of nuts $p$; but as soon as a block comes into contact with the road, its piston will be pressed into the hollow hub and the corresponding bag $n$ will be stretched. The dimensions of the wheel and the number of the spokes are calculated so that always two or three blocks are in contact with the road when the vehicle is normally loaded. The flexible rings 2 serve besides for transmitting the shocks and pressure exerted by the road upon the wheel, to the pistons adjacent with those which are just in contact with the road.

We claim:—

A cushion wheel comprising in combination with the hollow hub having a hollow extension communication with the main part of the hub, vertical flanges of said hub, an inner crown between said flanges having an opening through which the hollow extension communicates with the hollow main part, an outer crown between said lateral flanges having threaded openings, one for each spoke, a flange at the upper end of each of said openings, a nut screwed into said opening having a central boring, an india-rubber bag being fixed with the flanged edge of its open end between said nut and said flange so that its top part projects into the hollow hub, a piston guided in said nut, a stepped head of said piston penetrating into the correspondingly shaped top part of the india-rubber bag, metal rings inserted in the inner surface of said bag, each embracing one of the steps of the piston head, means for preventing a lateral deviation of the india-rubber bag, a shoe forming the outer end of the spoke, an upwardly directed flange at each of the long sides of said shoe and a downwardly directed flange having an internal groove at each of the long sides of said shoes, superposed rings of flexible material placed at each side of the spokes upon said shoes so as to form a flexible felly, means for securing said rings upon the shoes, a nut for each spoke to press said rings strongly upon its shoe, india-rubber sheaths fixed to the lower end of the hollow guide nut of the piston and to the upper end of said pressure nuts forming a lubricating chamber for each piston, the lubricant mainly consisting of castor oil filling said lubricating chamber and the hollow hub and its hollow extension, an air chamber in said hollow extension and a regulating piston in said extension for regulating the pressure in the hub, substantially as described and for the purpose set forth.

In witness whereof we have hereunto set our hands in the presence of two witnesses.

HENRI OUDINOT.
CHARLES PUTOIS.

Witnesses:
ALFRED FREY,
DEAN M. MASON.